March 10, 1959 E. H. HURLEY ET AL 2,877,030
COLLAPSIBLE SWING SUPPORTING FRAME
Filed Aug. 10, 1956
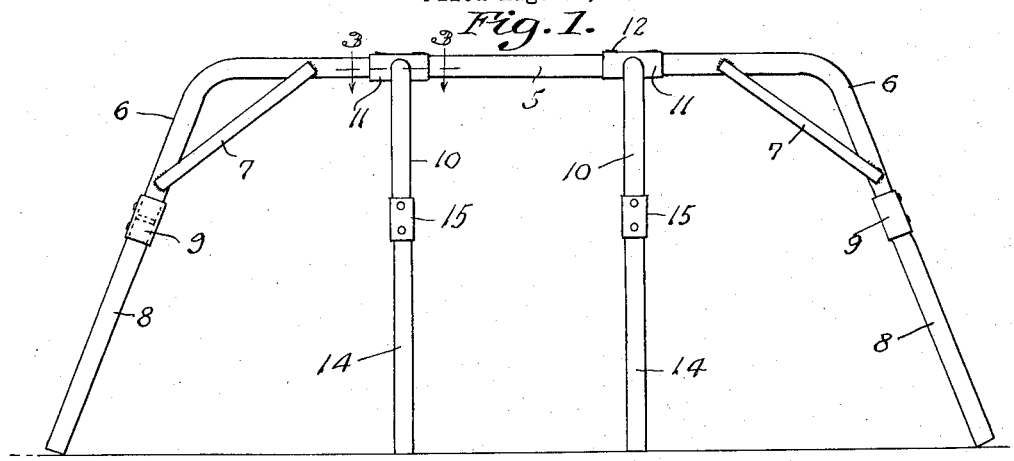
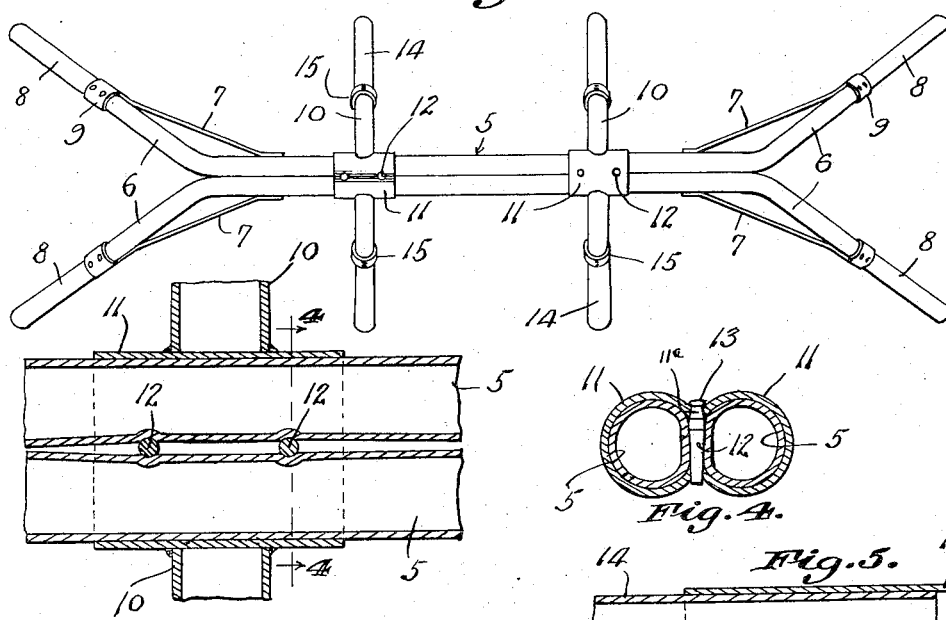
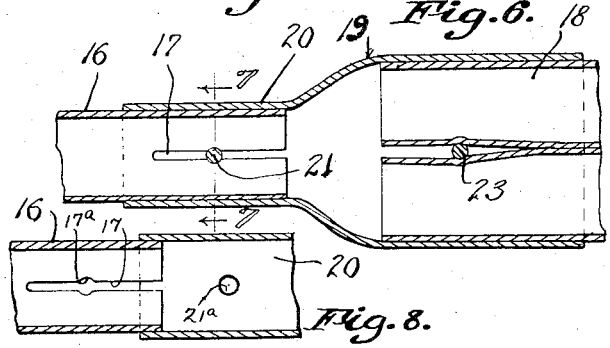
Earl H. Hurley
Eldora A. Hurley
INVENTORS
BY C. A. Snow & Co.
ATTORNEYS.

United States Patent Office 2,877,030
Patented Mar. 10, 1959

2,877,030

COLLAPSIBLE SWING SUPPORTING FRAME

Earl H. Hurley and Eldora A. Hurley, Corry, Pa.

Application August 10, 1956, Serial No. 603,294

1 Claim. (Cl. 287—54)

This invention relates to a means for connecting telescoping members in the formation of portable supporting frames for swings or the like, which will eliminate the use of hazardous breakable cast iron fittings and at the same time avoid projecting bolts and nuts common to conventional fitting construction.

Another object of the invention is to provide an improved connector in the form of a longitudinally split coupling sleeve adapted to be inserted in the abutting ends of a pair of aligned tubes so as to firmly secure said tubes together.

Still another object of the invention is to provide an improved connector which will remain tight under vibration, insuring an exceptionally rigid and durable supporting structure.

A further object of the invention is to provide an improved connector with one or more locating openings so arranged that when the connector is inserted in the abutting ends of adjacent tubes, the connector openings will align with holes in the tubes for the reception of securing pins that hold the tubes together.

A still further object of the invention is to provide an improved connector in the form of a tube having slots extending inwardly towards the center thereof and from the ends of the tubes, the slotted ends of the tube being inserted in the ends of the frame tubes to be connected, the tubes being so constructed and arranged that openings are provided in which securing pins are driven, the heads of the pins lying flush with the surfaces of the tubes being connected.

Other and further objects and advantages of the invention will be hereinafter described and the novel features thereof defined in the appended claim.

Referring to the drawing:

Fig. 1 is a side elevational view of a swing supporting frame, constructed in accordance with the invention.

Fig. 2 is a plan view thereof.

Fig. 3 is a sectional view taken on line 3—3 of Fig. 1.

Fig. 4 is a sectional view taken on line 4—4 of Fig. 3.

Fig. 5 is a sectional view taken on line 5—5 of Fig. 7.

Fig. 6 is a longitudinal sectional view through a modified form of the invention.

Fig. 7 is a sectional view taken on line 7—7 of Fig. 6.

Fig. 8 is a fragmental sectional view illustrating the cooperating ends of a pair of tubular sections to be connected.

Referring to the drawing in detail, the frame forming the subject matter of the present invention, is especially designed for use in supporting swings.

As shown, the frame comprises main horizontal tubes 5 arranged in parallel relation with respect to each other and contacting throughout the main portions of their lengths, as better shown by Fig. 2 of the drawing.

The ends 6 of said main horizontal tubes 5 diverge and extend downwardly, as shown by Fig. 1 of the drawing. These tubes may terminate centrally in sleeves 11 to form sectional frames.

The downwardly extended ends 6 of the main horizontal tubes are braced by means of brace rods 7 that connect between the straight main portions of the tubes and the downwardly diverging ends thereof, the braces 7 being welded to the tubes 5.

Extension legs 8 are connected with the ends of the end sections 6, by means of the sleeves 9, which sleeves are pinned, welded or swaged to the ends 6.

The reference character 10 indicates intermediate supporting legs which are welded to the sleeves 11, the intermediate supporting legs being extended downwardly and laterally to brace the frame against rocking when a person uses a swing supported thereon.

The sleeves 11 are formed with openings 11a that are so arranged that they will fall opposite to the space between adjacent horizontal tubes 5 as better shown by Fig. 3 of the drawing, so that when the securing pins 12 are driven into the openings 11a of the sleeves, the pins 12 will move between the horizontal tubes spreading them and causing them to tightly engage the inner surfaces of the sleeves 11, setting up a binding action to securely hold the intermediate supporting legs in their proper spaced relation with respect to the main horizontal tubes 5. These supporting pins 12 are of a novel construction, and as shown by Fig. 4 of the drawing, the supporting pins are tapered from points adjacent to the heads, to the narrow ends thereof, the pins being also reversely tapered from a point adjacent to the heads 13 to points where the tapered ends merge with the inclined portions adjacent to the heads 13. Thus it will be seen that due to this construction, as the pins 12 are driven into the openings, the inclined portions of the pins will pass between the adjacent horizontal tubes spreading them. The inclined portions of the pins adjacent to the heads 13 will now be locked with the walls of the openings of the sleeves 11 securely fastening the sleeves 11 and their supporting legs together.

Extension legs in the form of tubes are indicated by the reference character 14, and are connected with the intermediate supporting legs 10, by sleeves 15 which sleeves are connected with the intermediate supporting legs and their extensions to hold them together, as by means of the pins such as indicated at 12.

It may be stated here that legs 14 may be of various shaped solid stock, and pins may be other than round.

In the modified form of the invention as illustrated by Fig. 6 of the drawing, the frame embodies a main tube 16 slotted at its ends as at 17, the slots being disposed opposite to each other and extending inwardly from the ends thereof.

The reference character 18 indicates the ends of the supporting legs that are arranged in contact parallel relation with respect to each other, as shown by Fig. 6 of the drawing. A reduction fitting 19 is provided for connecting the tube 16 and supporting legs 18, the reduced end 20 of the reduction fitting being positioned over one end of the tube 16. The reduction fitting 19 is formed with an opening 21a aligning with the slot 17 of the tube 16 to accommodate a pin 21 which is identical with the pin 12 as shown by Fig. 4 of the drawing. In this form of the invention, the pin 21 is also formed with a slight back taper near the head 22 thereof, to receive the edges of the opening of the reduced end 20 and slot of tube 16, securing the pin in position. It might be here stated that the tube 16 is provided with portions 17a for the reception of the pin 21 after the sections have been properly placed to receive the pin.

In this form of the invention a pin corresponding to the pin 21 and indicated by the reference character 23 is extended through an opening in the reduction fitting and wedged between the adjacent ends 18 of the supporting legs, spreading them laterally securing the supporting legs within the reduction fitting, with a choke fit.

From the foregoing it will be seen that due to the construction shown and described, I have provided a support which may be readily dismantled and erected, with due consideration directed to the strength and durability of the frame for accomplishing the purpose of the invention.

Having thus described the invention, what is claimed is:

A supporting frame comprising a pair of tubular members connected together to form a main tube, the ends of said tubular members diverging downwardly and outwardly to form leg sections, additional leg sections, fittings connecting said additional leg sections to said main tube, said fittings including apertured sleeves, a recess between said tubular members aligned with the apertures in said sleeves, tapered headed pins, force fitted in said apertures and recesses, to hold said additional leg sections in related assembly with said main tube and against rotation relative thereto and auxillary leg sections connected to said leg sections and said additional leg sections.

References Cited in the file of this patent

UNITED STATES PATENTS

| | | | |
|---|---|---|---|
| 295,559 | Kitson | Mar. 25, | 1884 |
| 551,016 | Ward | Dec. 10, | 1895 |
| 1,164,161 | Ayers | Dec. 14, | 1915 |
| 1,165,514 | Kelly | Dec. 28, | 1915 |
| 1,845,677 | Mekeel | Feb. 16, | 1932 |
| 2,161,978 | Rosenbaum | June 13, | 1939 |
| 2,185,725 | Elliott | Jan. 2, | 1940 |
| 2,317,243 | Anderegg | Apr. 20, | 1943 |
| 2,711,917 | Blu | June 28, | 1955 |

FOREIGN PATENTS

| | | | |
|---|---|---|---|
| 551,016 | Great Britain | Jan. 8, | 1898 |
| 703,034 | Great Britain | Jan. 27, | 1954 |